United States Patent [19]
Kölsch et al.

[11] Patent Number: 5,453,875
[45] Date of Patent: Sep. 26, 1995

[54] MONOCULAR TELESCOPE HAVING A FOCUSING UNIT WHOSE MECHANICAL SENSITIVITY CAN BE VARIED

[75] Inventors: Lothar Kölsch, Wilnsdorf; Alfred Hengst, Lahnau; Heinz Keiner, Solms, all of Germany

[73] Assignee: Leica Camera GmbH, Solms, Germany

[21] Appl. No.: 120,819

[22] Filed: Sep. 15, 1993

[30] Foreign Application Priority Data

Sep. 22, 1992 [DE] Germany ............. 42 31 655.3

[51] Int. Cl.⁶ ..................... G02B 27/00; G02B 23/08
[52] U.S. Cl. ..................... 359/399; 359/405; 359/410
[58] Field of Search ................. 359/399, 402, 359/405, 410, 420–422, 425, 432

[56] References Cited

U.S. PATENT DOCUMENTS

| | | | |
|---|---|---|---|
| 1,088,494 | 2/1914 | Warner | 359/421 |
| 3,028,792 | 4/1962 | Krajowsky et al. | 88/32 |
| 4,249,793 | 2/1981 | Uehara | 359/422 |
| 4,600,277 | 7/1986 | Murray, Jr. | |

FOREIGN PATENT DOCUMENTS

| | | |
|---|---|---|
| 1109398 | 11/1958 | Germany . |
| 1243405 | 6/1967 | Germany . |
| 2005396 | 1/1971 | Germany . |
| 499119 | 12/1970 | Switzerland . |

OTHER PUBLICATIONS

Nefodov et al., "Telescope with two magnifications", Sov. J. Opt. Technol. vol. 43, #6, Jun. 1976 pp. 360–361.
Optolyth–Femrohre und Spektive (Jul. 1993).

*Primary Examiner*—Vincent P. McGraw
*Assistant Examiner*—K. P. Hantis
*Attorney, Agent, or Firm*—Foley & Lardner

[57] ABSTRACT

A monocular telescope having a constant length includes a lens mounted in a tube and interchangeable eyepieces to vary the magnification. Focusing is performed using a positioning member to move a focusing unit axially in the tube. The rate of focus adjustment is adaptable to the selected magnification due to the provision of a transmission gear having different diameter gear wheels arranged along the positioning member. The transmission gear can be operatively coupled to the interchangeable eyepiece.

10 Claims, 3 Drawing Sheets

5,453,875

MONOCULAR TELESCOPE HAVING A FOCUSING UNIT WHOSE MECHANICAL SENSITIVITY CAN BE VARIED

BACKGROUND OF THE INVENTION

The invention relates to a monocular telescope. More specifically, the invention relates to a monocular telescope having a constant length and a focusing unit whose mechanical sensitivity depends on the chosen magnification.

German Offenlegungsschrift 20 05 396, published Jan. 7, 1971, discloses a telescope with a focusing device in which a rotatable focusing drive mechanism acts on a focusing element which is axially displaceable in the tube of the telescope. A cam with a hermetically sealed sliding surface is provided as a geared connection between the focusing drive mechanism and the focusing element. The entire focusing range is covered by a half to a whole revolution of the focusing drive mechanism, with the direction of rotation of the focusing drive mechanism remaining the same. In order to step up or reduce the magnitude of the displacement achieved by the cam, a transmission gear is provided between the cam and the focusing element. This telescope has a constant magnification and a fixed eyepiece.

German Auslegeschrift 11 09 398, published Jun. 22, 1961, discloses a telescope with variable magnification whose eyepiece tube is extended to different lengths depending on the chosen magnification. The eyepiece tube is guided in a cam sleeve. A cam slot is provided for positive rotation when changing the extension. The cam slot is coupled in a longitudinally displaceable but relatively non-rotatable fashion to a carrier of an erecting structure which is guided by a second cam slot for positive displacement during rotation of the cam sleeve. As a result, large changes in the telescope magnification can be achieved. Focusing is performed by means of a fine adjustment nut. The focus adjustment, once set for a specific distance, is retained over the entire magnification range.

U.S. Pat. No. 3,028,792, issued Apr. 10, 1962, discloses a telescope with continuously variable magnification which has two coaxial rotating knobs which are arranged in a housing recess and are separated by a divider. The rotating knob on the lens side displaces a focusing lens via a threaded shaft for the purpose of focusing. The rotating knob on the eyepiece side is used to change the magnification by means of two axially displaceable lenses whose movement is controlled by a spiral cam.

A monocular telescope having a constant length is also known. In such a telescope, it is possible to achieve a stepwise variation in the magnification, for example, 20-, 30-, and 40-fold, by means of an interchangeable eyepiece. It is also possible to achieve a continuously variable magnification setting, for example, 20- to 60-fold, using a zoom eyepiece. Focusing is performed manually by means of a control knob whose rotary movement effects the axial displacement of a focusing element. Due to a shallow depth of focus at high magnifications, it is difficult to focus the telescope using the control knob because the focal plane is traversed too quickly. Analogous problems occur at low magnifications, i.e., it takes too long to adjust the focus. For these reasons the rate of focus adjustment is designed for an average magnification value.

SUMMARY OF THE INVENTION

An object of the invention is to provide a monocular telescope having a constant length and variable magnification which has a rate of focus adjustment which is automatically optimized in accordance with the magnification.

Another object of the invention is to provide a variable-magnification telescope having a focusing unit whose mechanical sensitivity depends on the chosen magnification.

According to one aspect of the invention, there is provided a monocular telescope having a constant length. The telescope includes a lens arranged in a tube. The tube accommodates interchangeable eyepieces which vary the magnification of the telescope. A focusing unit moves by adjusting a positioning member. A transmission gear assembly, coupled to the focusing unit and to the positioning member, adapts the rate at which the focusing unit moves for focusing to the chosen magnification.

According to a second aspect of the invention, there is provided a telescope which includes a tube that accommodates one of a set of interchangeable eyepieces which determine the magnification of the telescope. The length of the tube and any of the interchangeable eyepieces is constant. The telescope also includes a focus control actuator, focusing optics, a carriage having at least two toothed racks to control movement of the focusing optics, and a transmission gear assembly having at least two differently sized gears. Another assembly, coupled to the focus control actuator and to the carriage, selectively causes one of the at least two differently sized gears to engage one of the at least two toothed racks such that the rate at which the focusing optics move for focusing is adaptable to the chosen magnification.

Other objects, features, and advantages of the invention will be apparent from the detailed description of preferred embodiments set forth below.

BRIEF DESCRIPTION OF THE DRAWINGS

Preferred embodiments of the invention will be described below with reference to the accompanying drawings, wherein.

DETAILED DESCRIPTION OF PREFERRED EMBODIMENTS

Figure 1:
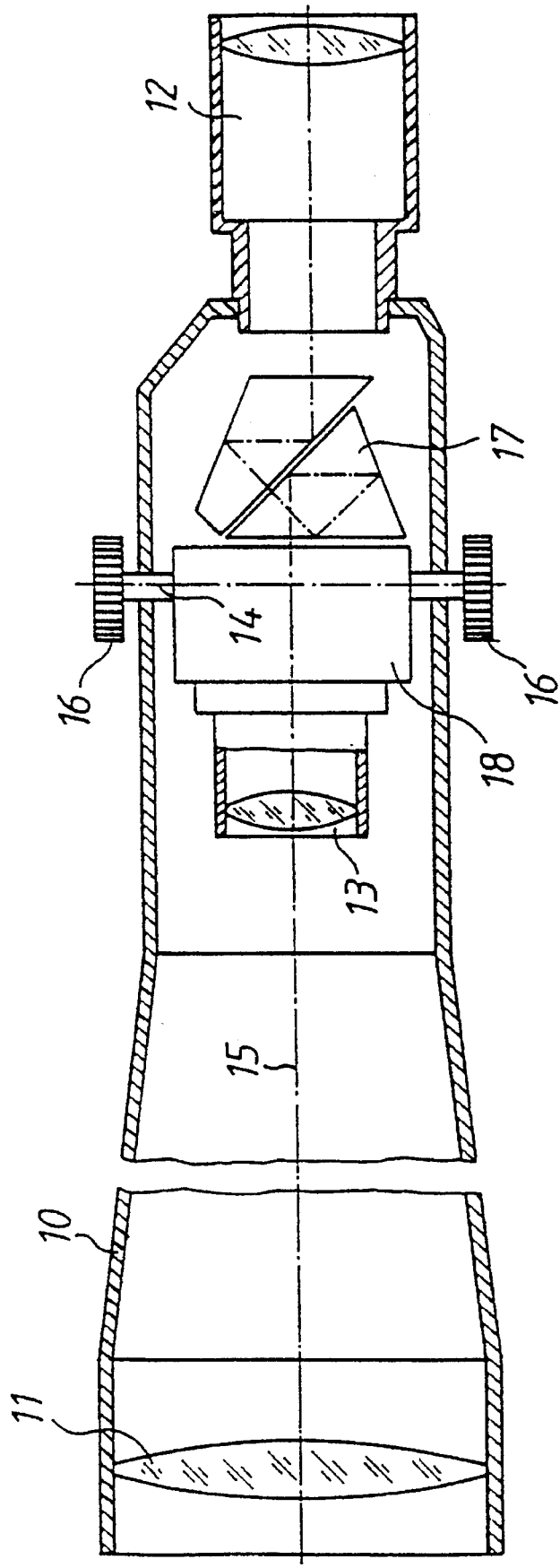
FIG. 1 illustrates a longitudinal section through a telescope constructed according to a first embodiment of the invention.

FIG. 1 illustrates a monocular telescope according to a first preferred embodiment of the invention. As shown in FIG. 1, the telescope has a tube 10 which supports a lens 11. An eyepiece situated opposite the lens 11 is provided in the form of an interchangeable eyepiece 12. The magnification is varied by changing the eyepiece. For example, eyepiece 12 can be one of a set of individual eyepieces of different magnifications such as 20-, 40-, and 60-fold. Alternatively, eyepiece 12 can be a varifocal eyepiece having a continuously variable magnification such as 20- to 60-fold.

A focusing unit 13 is provided for focusing. Focusing unit 13 includes a lens system and is displaced along the optical axis 15 of the telescope using a positioning member, or shaft 14. The positioning member 14 has knurled knobs 16 at both ends. A set of prisms 17 is mounted in the tube 10 between the focusing unit 13 and the interchangeable eyepiece 12 to deflect the beam path. The positioning member 14 is connected to a transmission gear 18, which is shown diagrammatically in FIG. 1.

Figure 2:
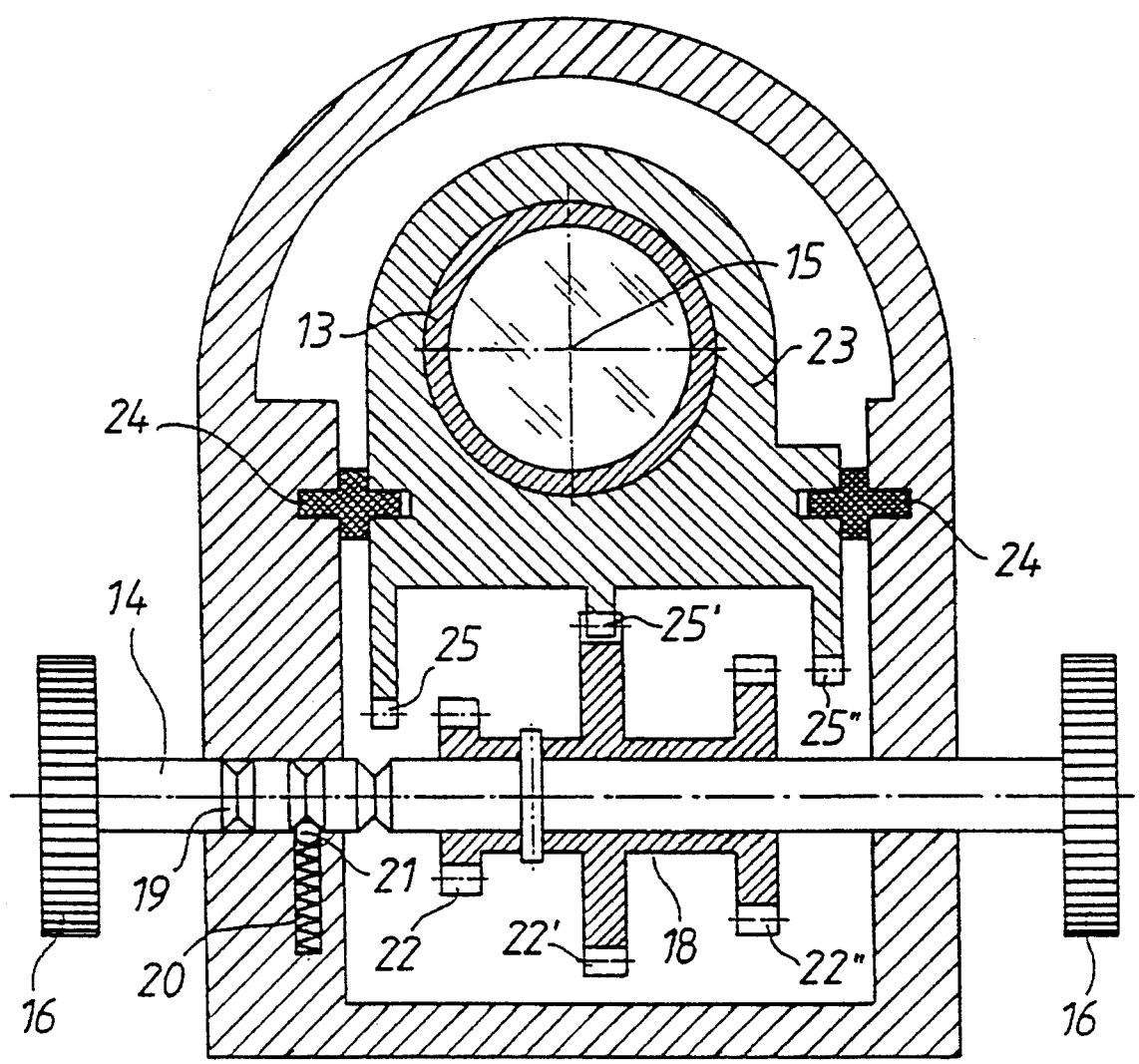
FIG. 2 illustrates a cross section showing details of a gear assembly of FIG. 1.

The construction of the transmission gear 18 of the first embodiment is illustrated in detail in FIG. 2. Gear wheels 22, 22', and 22" having different diameters are mounted on the positioning member 14. A latching/locking mechanism composed of latching grooves 19, spring 20, and ball 21 are provided along the rotational axis of member 14. A carriage 23 is located above the positioning member 14 along the optical axis 15 and moves along guideways 24. Carriage 23 holds the focusing unit 13. On its underside, carriage 23 has toothed racks 25, 25' and 25" which are designed to engage the corresponding gear wheels 22, 22', and 22".

In FIG. 2, wheel 22' (the largest diameter gear wheel) is shown engaged with rack 25'. If member 14 is moved to the left, then wheel 22 (the smallest diameter gear wheel) will engage rack 25. Similarly, if member 14 is moved to the right, then wheel 22" (the intermediate diameter gear wheel) will engage rack 25". The distance which carriage 23 moves per degree of rotation of knobs 16 varies depending upon which gear wheel is engaged. The rate of focus adjustment can thus be adjusted by the user in three steps, using the transmission gear 18, in accordance with the magnification of the interchangeable eyepiece 12 being used.

Figure 3:
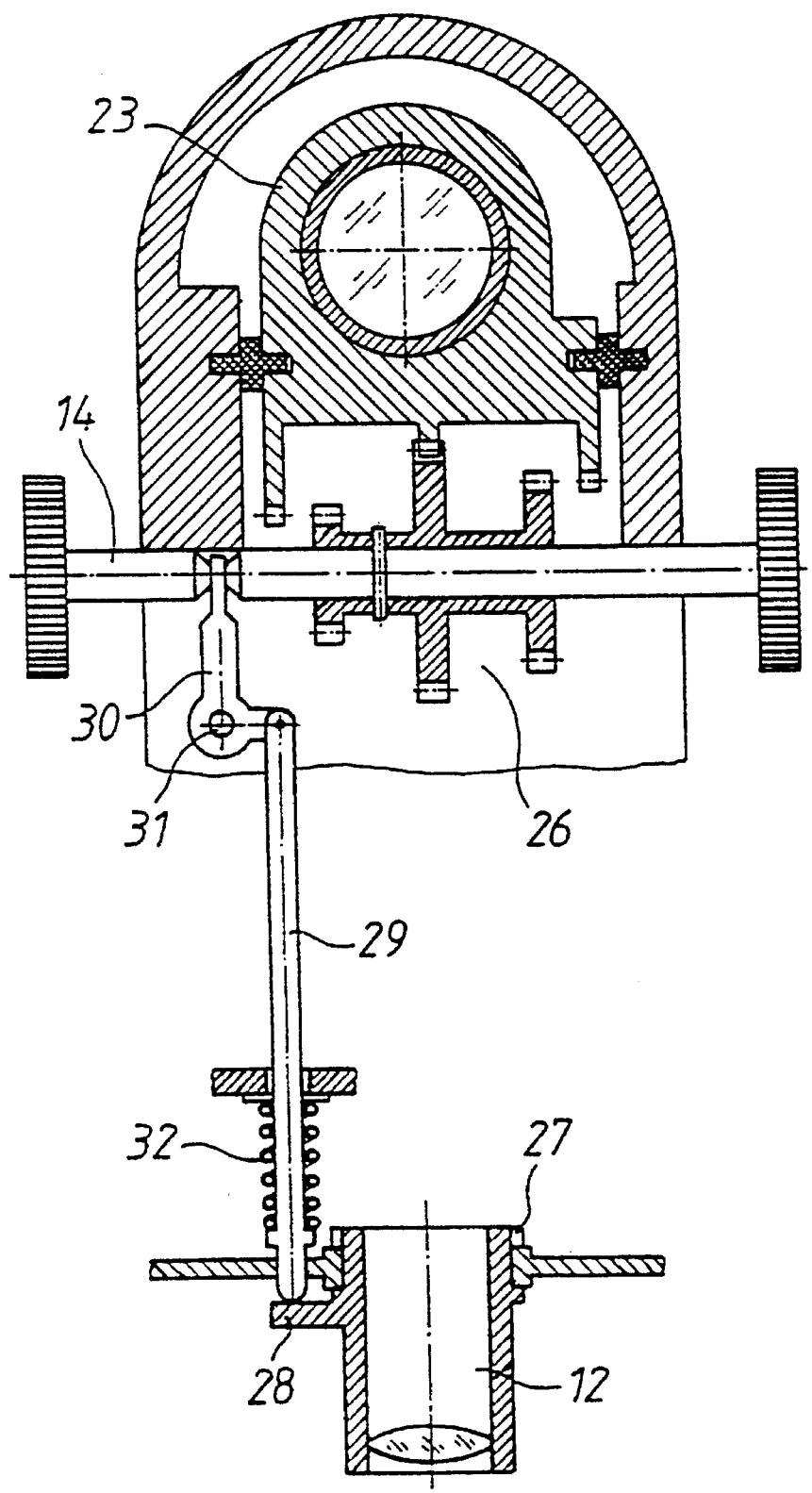
FIG. 3 illustrates a cross section through a gear assembly according to a second embodiment of the invention.

FIG. 3 illustrates a second preferred embodiment of the invention. The embodiment shown in FIG. 3 differs from that shown in FIG. 2 in that the FIG. 3 embodiment uses a transmission gear 26 which is mechanically coupled to the interchangeable eyepiece 12. In this design, when the eyepiece 12 is interchanged, the rate of focus adjustment corresponding to the magnification of the selected eyepiece is automatically adjusted for optimum focusing.

In FIG. 3, the interchangeable eyepiece 12 is mounted on the telescope by means of a bayonet 27, which has a collar 28. The axial depth of collar 28 varies according to the magnification of the eyepiece. A control pin 29 abuts collar 28. The other end of control pin 29 is connected to an angle lever 30 which pivots about an axis 31 and acts on positioning member 14. Under the force of a spring 32, the control pin 29 is axially displaced based on the axial position of the collar 28. Angle lever 30 transfers this displacement into a displacement of the positioning member 14 at right angles thereto. Carriage 23 and transmission gear 26, arranged on the positioning member 14, have essentially the same design as carriage 23 and transmission gear 18 of FIG. 2.

Numerous variations of the above-described embodiments are possible without departing from the scope and spirit of the invention. For example, in the case of an interchangeable eyepiece with variable magnification, it is possible to provide an integrally formed cam against which a control pin bears in place of an integrally formed collar. A coaxial coarse/fine drive mechanism similar to those used for focusing in microscopes can be used in an arrangement designed for two different magnifications. Moreover, manual adjustment can be replaced by motorized adjustment and an electrical control knob or switch can be provided in place of the knurled knobs. As will be understood to those skilled in the art, the focusing element can be constructed using other optical arrangements, for example, a set of prisms mounted on a toothed rack which moves axially by means of a gear wheel mounted on the positioning member.

Accordingly, the scope of the invention is defined by reference to the following claims.

What is claimed is:

1. A monocular telescope having a constant length, comprising:

a lens arranged in a tube, the tube accommodating interchangeable eyepieces which vary the magnification of the telescope;

a focusing unit which moves by adjusting a positioning member; and a transmission gear assembly, coupled to the focusing unit and to the positioning member, which sets the rate at which the focusing unit moves for focusing per unit of rotation of the positioning member to one of at least two different rates.

2. A monocular telescope as claimed in claim 1, wherein the positioning member includes a shaft and wherein the transmission gear assembly includes at least two differently sized gears along the shaft.

3. A monocular telescope as claimed in claim 1, wherein the positioning member is operatively coupled by a mechanical assembly to an interchangeable eyepiece such that the interchangeable eyepiece determines the position of the positioning member.

4. A monocular telescope as claimed in claim 1, wherein the focusing unit includes a lens system.

5. A monocular telescope as claimed in claim 1, wherein the focusing unit includes a prism system.

6. A monocular telescope as claimed in claim 3, wherein the mechanical assembly includes a control pin which is displaceable with a collar on the interchangeable eyepiece and which is coupled to an angle lever which acts on the positioning member.

7. A telescope, comprising:

a tube, the tube accommodating one of a set of interchangeable eyepieces which determine the magnification of the telescope, the length of the tube and any of the interchangeable eyepieces being constant;

a focus control actuator;

focusing optics;

a carriage to control movement of the focusing optics, the carriage having at least two toothed racks;

a transmission gear assembly having at least two differently sized gears; and an assembly, coupled to the focus control actuator and to the carriage, which selectively causes one of the at least two differently sized gears to engage one of the at least two toothed racks such that the rate at which the focusing optics move for focusing is set in accordance with a chosen magnification.

8. A monocular telescope having a constant length, comprising:

a lens arranged in a tube, the tube accommodating interchangeable eyepieces which vary the magnification of the telescope;

a focusing unit which moves by adjusting a positioning member; and a transmission gear assembly, coupled to the positioning member, for moving the focusing unit at two or more different rates.

9. A monocular telescope as claimed in claim 8, wherein said transmission gear assembly comprises at least two differently sized gears.

10. A monocular telescope having a constant length, comprising:

a lens arranged in a tube, the tube accommodating interchangeable eyepieces which vary the magnification of the telescope;

a focusing unit which moves by adjusting a positioning member; and a transmission gear assembly, coupled to the positioning member, which provides coarse and fine adjustment for the focusing unit.

* * * * *